United States Patent
Bonnes et al.

(10) Patent No.: US 9,083,720 B2
(45) Date of Patent: Jul. 14, 2015

(54) MANAGING SECURITY OBJECTS

(75) Inventors: Augustinus H. J. Bonnes, Zandt (NL); Hans Schoone, Delft (NL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 77 days.

(21) Appl. No.: 13/504,020

(22) PCT Filed: Aug. 26, 2010

(86) PCT No.: PCT/EP2010/062483
§ 371 (c)(1), (2), (4) Date: Apr. 25, 2012

(87) PCT Pub. No.: WO2011/054555
PCT Pub. Date: May 12, 2011

(65) Prior Publication Data
US 2012/0233670 A1    Sep. 13, 2012

(30) Foreign Application Priority Data
Nov. 6, 2009  (EP) .................................... 09175297

(51) Int. Cl.
*G06F 7/04* (2006.01)
*G06F 15/16* (2006.01)
(Continued)

(52) U.S. Cl.
CPC ............ *H04L 63/105* (2013.01); *G06F 21/604* (2013.01); *H04L 63/102* (2013.01)

(58) Field of Classification Search
CPC ............................... H04L 63/10; H04L 63/101
See application file for complete search history.

(56) References Cited

U.S. PATENT DOCUMENTS 8,205,092 B2 * 6/2012 Stokes .......................... 713/182
2003/0236979 A1 * 12/2003 Himmel et al. ............... 713/167
(Continued)

FOREIGN PATENT DOCUMENTS

CN  1845032 A  10/2006
CN  101568921 A  10/2009
(Continued)

OTHER PUBLICATIONS

Kathy Cartrysse, Examiner/Authorized Officer, European Patent Office, International Search Report for PCT Application No. PCT/EP2010/062483, Nov. 5, 2010, pp. 1-3, Rijswijk, The Netherlands.
(Continued)

*Primary Examiner* — Andrew Nalven
*Assistant Examiner* — Quy Pham
(74) *Attorney, Agent, or Firm* — Lee Law, PLLC; Christopher B. Lee

(57) ABSTRACT

A message that a user is requesting an access to a resource is received. The access is associated with a requested access level and is granted if an access path exists between the user and the resource for the requested access level. In response to the message reception, a first identifier of the user, a second identifier of the resource, the requested access level, and a first value that represents that the access to the resource was requested is stored in a record. All access paths usable to determine whether the user is authorized to access the resource are identified. Another security object including a flag to represent its usage in authorizing access to the resources is received. A decision is made with respect to whether the received other security object was used within one of the identified access paths as a function of its flag value.

21 Claims, 4 Drawing Sheets

(51) Int. Cl.
*G06F 17/30* (2006.01)
*G06F 12/14* (2006.01)
*G06F 12/16* (2006.01)
*H04L 29/06* (2006.01)
*G06F 21/60* (2013.01)

(56) References Cited

U.S. PATENT DOCUMENTS

2008/0154798 A1 6/2008 Valz
2009/0007229 A1 1/2009 Stokes
2009/0052451 A1* 2/2009 Etheridge ............... 370/392
2009/0138938 A1* 5/2009 Harrison et al. ............ 726/1
2009/0249440 A1 10/2009 Platt et al.

FOREIGN PATENT DOCUMENTS

EP 0605106 A1 7/1994
EP 1710978 A1 * 10/2006
WO 2008093320 A1 8/2008

OTHER PUBLICATIONS

Kathy Cartrysse, Examiner/Authorized Officer, European Patent Office, Written Opinion for PCT Application No. PCT/EP2010/062483, Nov. 5, 2010, pp. 1-7, Rijswijk, The Netherlands.

Author Unknown, Examiner, State Intellectual Property Office of the People's Republic of China, Office Action for CN Application No. 201080050156.0 (English translation not available), May 6, 2014, pp. 1-8, P. R. China.

* cited by examiner

MANAGING SECURITY OBJECTS

RELATED APPLICATIONS

This application is a National Stage application of, claims priority to, and claims the benefit of International Application Serial No. PCT/EP2010/062483, titled "METHOD AND SYSTEM FOR MANAGING SECURITY OBJECTS," filed Aug. 26, 2010, in the European Patent Cooperation Treaty Receiving Office, which further claims priority to, and claims the benefit of European Patent Application Serial No. 09175297.2, titled "METHOD AND SYSTEM FOR MANAGING SECURITY OBJECTS," filed Nov. 6, 2009, in the European Patent Office, the entire contents of each application are hereby incorporated by reference as if fully set forth herein.

BACKGROUND

The present invention relates to managing security objects in a computer system.

Modern transactional environments include specialized security modules to manage access by a user to a resource. Systems and methods have been derived to facilitate the management of the security rules used to ensure that only authorized operations are performed on such systems.

One prior approach is for auditing a security policy, and in particular how log records containing information about recorded use of security rules may be used to obtain information about the rules in relation to recorded security objects.

Another prior approach is for managing access to resources across a network, and in particular how access requests may be intercepted and how the request may be granted or denied using a central admin server, database (DB) server and controller in a networked environment.

BRIEF SUMMARY

A method for managing, in a computer system network, access by a user to a resource, involves receiving a message that the user is requesting an access to the resource, the access being associated with a requested access level, the access being granted if there exists an access path between the user and the resource for the requested access level, the access path comprising an identity annunciator that represents an identity of the user; and an access control descriptor that represents an authorized access level up to which the user represented by the identity annunciator is authorized to access the resource or a group of resources comprising the resource; where the identity annunciator and the access control descriptor are both security objects each comprising a flag to represent its usage in authorizing access to resources; storing in a record, in response to the message reception, a first identifier of the user, a second identifier of the resource, the requested access level, and a first value that represents that the access to the resource was requested; identifying all access paths usable to determine whether the user is authorized to access the resource with the requested access level; setting the flag of the security objects of each identified access path to the first value; receiving another security object comprising a flag to represent its usage in authorizing access to the resources; and making a decision with respect to whether the received other security object was used within one of the identified access paths as a function of its flag value.

An apparatus for managing, in a computer system network, access by a user to a resource, includes a memory and a processor programmed to receive a message that the user is requesting an access to the resource, the access being associated with a requested access level, the access being granted if there exists an access path between the user and the resource for the requested access level, the access path comprising an identity annunciator that represents an identity of the user; and an access control descriptor that represents an authorized access level up to which the user represented by the identity annunciator is authorized to access the resource or a group of resources comprising the resource; where the identity annunciator and the access control descriptor are both security objects each comprising a flag to represent its usage in authorizing access to resources; store in a record in the memory, in response to the message reception, a first identifier of the user, a second identifier of the resource, the requested access level, and a first value that represents that the access to the resource was requested; identify all access paths usable to determine whether the user is authorized to access the resource with the requested access level; set the flag of the security objects of each identified access path to the first value; receive another security object comprising a flag to represent its usage in authorizing access to the resources; and make a decision with respect to whether the received other security object was used within one of the identified access paths as a function of its flag value.

A computer program product for managing, in a computer system network, access by a user to a resource includes a computer readable storage medium including computer readable program code, where the computer readable program code when executed on a computer causes the computer to receive a message that the user is requesting an access to the resource, the access being associated with a requested access level, the access being granted if there exists an access path between the user and the resource for the requested access level, the access path comprising an identity annunciator that represents an identity of the user; and an access control descriptor that represents an authorized access level up to which the user represented by the identity annunciator is authorized to access the resource or a group of resources comprising the resource; where the identity annunciator and the access control descriptor are both security objects each comprising a flag to represent its usage in authorizing access to resources; store in a record, in response to the message reception, a first identifier of the user, a second identifier of the resource, the requested access level, and a first value that represents that the access to the resource was requested; identify all access paths usable to determine whether the user is authorized to access the resource with the requested access level; set the flag of the security objects of each identified access path to the first value; receive another security object comprising a flag to represent its usage in authorizing access to the resources; and make a decision with respect to whether the received other security object was used within one of the identified access paths as a function of its flag value.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

Figure 1:
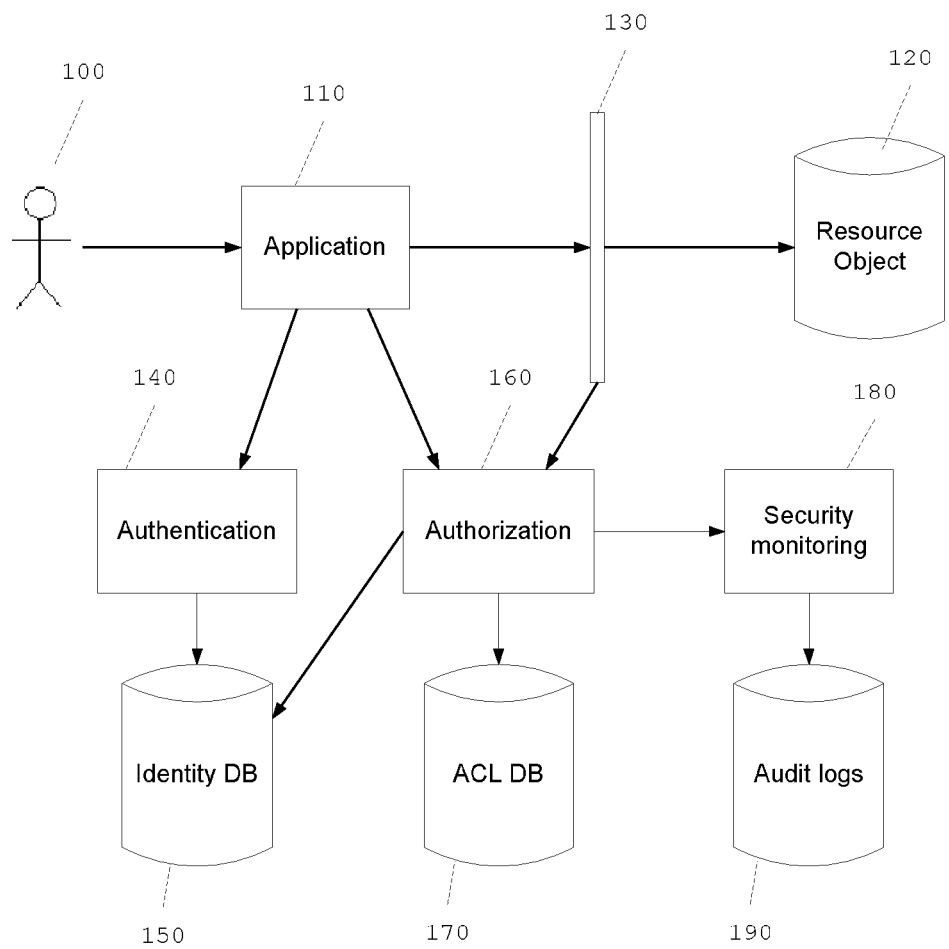
FIG. 1 is a block diagram of an example of an implementation of a system in which the present invention may be implemented according to an embodiment of the present subject matter.

FIG. 1 is a block diagram of an example of an implementation of a system including a user (100); an application (110); a resource object (120); a component for intercepting access requests (130); a user authentication component (140) for verifying user identity, for example by verifying a username and a password; a database for storing user identity and group hierarchy (150); a user authorization component (160) for granting or denying access to the resource object (120); a database of access control descriptors (170), also called access control lists; and a security monitoring component (180) for logging access request parameters in an audit database (190).

When an authenticated user (100) tries to access a resource object (120) for executing an action requiring a particular access level, such as read for a view action, or write for an update action, the user access must first be authorized by the authorization component (160). Such a component typically relies on the database of access control descriptors (170) to determine who has which access to a particular resource. The authorization may be requested by the application (110) trying to access the resource directly, or by the component for intercepting access requests (130), as it is often the case that applications do not always know the environment in which they are executed and thus may not be able to invoke directly the user authorization component (160).

Each time an access is requested, the authorization component (160) decides whether such access should be granted or denied. The authorization component (160) also triggers the security monitoring component (180) that is able to store in an audit log or audit trail database (190) details about the particular request that is being evaluated. The logging may be considered a trade-off between a minimum amount of details so as to have useful information, and a maximum amount of details so as not to impact the system performance too much. In complex systems, the number of access control descriptors may be close to several hundred thousands, with a great many users accessing resources at the same time. Such systems thus often keep the amount of details logged to a minimum.

Alternatively, the security monitoring component (180) is not triggered by the authorization component (160) directly, but by a specific component that intercepts the authorization requests, such as the component for intercepting access requests (130).

Conception of the present subject matter resulted from an observation that, as the number of users and resources in such systems may be extremely large, the associated complexity becomes impossible to manage by humans. The present subject matter improves management of security objects.

As described in more detail below, the present subject matter provides for logs recording the different access requests that minimize impact on system performance when a lot of simultaneous requests are being handled. Additionally, the present subject matter may detect security objects that are not used or that are seldom used, including the identity objects, such as groups or roles of which a user is a member, which are often overlooked by previous methods for managing security rules.

In a first development, a counter may be incremented each time an access is requested from the user to the resource. This value allows more precise decisions to be made with respect to security objects that are seldom used. For example, a decision may be made to delete the security object if its flag value is below a predefined threshold.

Additionally, a timestamp of a time at which the access is requested may further be recorded. The security object flag may be set to further include the timestamp. The timestamp allows more complex decisions to be made about objects that were used a long time ago, but not used recently, while leaving objects that have not yet been used unaffected. For example, a decision may be made to delete a security object if the timestamp set in its flag is older than a predefined date.

Further, conflicting access paths may be detected, with one of the access paths overruled. The access path that is overruled may have a flag set to a value to represent that it is not used. A decision may be made to delete a security object if the flag of the security object is set to a value that represents that it is not used.

Figure 2:
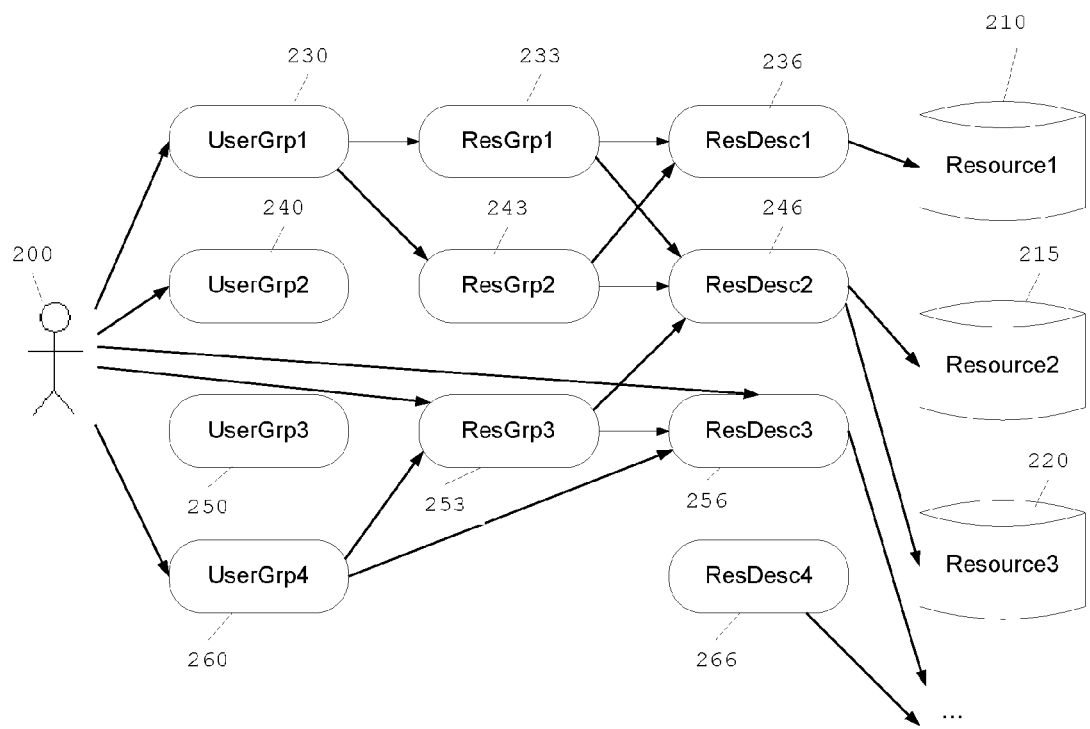
FIG. 2 shows examples of different access paths between a user and resources according to an embodiment of the present subject matter.

FIG. 2 shows examples of different access paths between a user and resources, including: a user (200); a first (210), second (215), and third resources (220) that may be accessed by the user; a first (230), second (240), third (250), and fourth user groups (260); a first (233), second (243), and third resource groups (253); and a first (236), second (246), third (256), and fourth access control descriptors (266).

The user (200) or the user groups (230, 240, 250, and 260) may be considered in the system as security objects for annunciating a particular identity: the one of the user (200), or the one of the group to which the user (200) belongs. The user groups (230, 240, 250, and 260) correspond in general to particular roles that the user (200) may have in the system.

The resource groups (233, 243, and 253) are created to reflect grouping of different resources, for example as part of a transaction.

An access control descriptor (236, 246, 256, or 266) is used to define which resources a particular identity is authorized to access, or conversely is denied to access, depending on how the system is configured.

In the example of FIG. 2, two access paths between the user (200) and the first resource (210) have been identified. The first access path consists of the user (200), which belongs to the first user group (230), which is referenced by the first resource group (233), which is in turn authorized to access the first resource (210) by the first access control descriptor (236).

The second access path consists of the user (200), which belongs to the first user group (230), which is referenced by the second resource group (243), which is in turn authorized to access the first resource (210) by the first access control descriptor (236).

Within the example of FIG. 2, there are four access paths between the user (200) and the second resource (215). The first access path consists of the user (200), which belongs to the first user group (230), which is referenced by the second resource group (243), which is in turn authorized to access the second resource (215) by the second access control descriptor (246).

The second access path consists of the user (200), which is referenced by the third resource group (253), which is in turn authorized to access the second resource (215) by the second access control descriptor (246).

The third access path consists of the user (200), which belongs to the fourth user group (260), which is referenced by the third resource group (253), which is in turn authorized to access the second resource (215) by the second access control descriptor (246).

The fourth access path consists of the user (200), which belongs to the first user group (230), which is referenced by the first resource group (233), which is in turn authorized to access the second resource (215) by the second access control descriptor (246).

The second access control descriptor (246) also grants access to the third resource (220). An access control descriptor may grant access or deny access to one or several resources or group of resources.

The user (200) also belongs to the second user group (240), but this group does not belong as an identity annunciator to an access path to any resources. The third user group (250) does not have any members.

Thus, there may be several access paths for a user to access a resource.

As there may be a lot of access control descriptors and groups (e.g., several hundred thousands), it is not unlikely that conflicting access paths may exist in the system (for example one access path prevents a user to read a resource, while another access path authorizes the same user to write the same resource). Security systems may be configured regarding how to react when such conflicts are identified (for example always authorizing the highest access level granted). Detection of such conflicts requires an exhaustive analysis of all the access paths between a user and each resource. During the access path analysis, the access rules that define access of users to resources are analyzed. A typical resource is a data file on a disk. These resources have various attributes (for instance name and location).

Based on these attributes, a security product may hold a resource-descriptor. These resource-descriptors are often contained together with many other descriptors (for example userids, groups, etc.) in a security database. A resource-descriptor may describe zero, one, or multiple resources. Such a resource-descriptor may be called a dataset profile or resource profile. In general, a resource-descriptor that describes multiple resources is called a generic profile, while a resource descriptor that describes one resource is called a discrete profile.

For some classes of resources it is possible (but not required), to group multiple resource-descriptors together in a resource-group. In FIG. 2, these are represented by the ResGrp1 (233), the ResGrp2 (243), and the ResGrp3 (253). Such resource groups may be defined as profiles in a grouping-class. Often, the corresponding resource-descriptors are called member-class profiles. If a resource-descriptor (for instance the ResDesc1 (233) in FIG. 2 above) is part of a resource-group, it does not always need to be physically present as a separate entity, but may be considered as defined by reference.

Resource-groups and resource-descriptors may each have an access-list. They may also have other attributes that control the access of all userids. The access lists may contain user identifiers and user-groups. User identifiers (or short userids) may be included as a member in one or multiple groups for different purposes. This represents the use of user-groups to grant or deny access to resources. Userids may have access to a resource because of attributes of the applicable resource-descriptor or resource-groups, because the userid is included in the applicable access control list (ACL), because one or more of its user-groups is included in the applicable ACL, or because of an attribute of the userid itself.

Because a userid may be a member of multiple user-groups, because resource-descriptors may be included in multiple resource-groups, and because both resource-descriptors and resource-groups may have access-lists, access of a userid to a resource may be controlled concurrently by multiple definitions. During the access path analysis, all different definitions that may control access of a userid to a resource are located and evaluated.

For example, as described above, in FIG. 2, the user (200) may have access to the second resource (215) through four different paths:

| | |
|---|---|
| a) userid->usergrp1->resgrp1->resdesc2->resource2 | Granting Read access |
| b) userid->usergrp1->resgrp2->resdesc2->resource2 | Granting Read access |
| c) userid->resgrp3->resdesc2->resource2 | Granting Read access |
| d) userid->usergrp4->resgrp3->resdesc2->resource2 | Granting Read access. |

The access levels granted by each of these four paths may be different or identical.

The result of the access path analysis is a complete representation of all different paths that allow access, while discarding all paths that are irrelevant because the access granted is not used for the actual access decision. For example, the read access granted by paths a), b) and d) are discarded because they are superseded by the explicit userid-level access granted by path c). This type of analysis uses the static data as present in the security definitions. Sometimes this is referred to herein as a static analysis.

Figure 3:
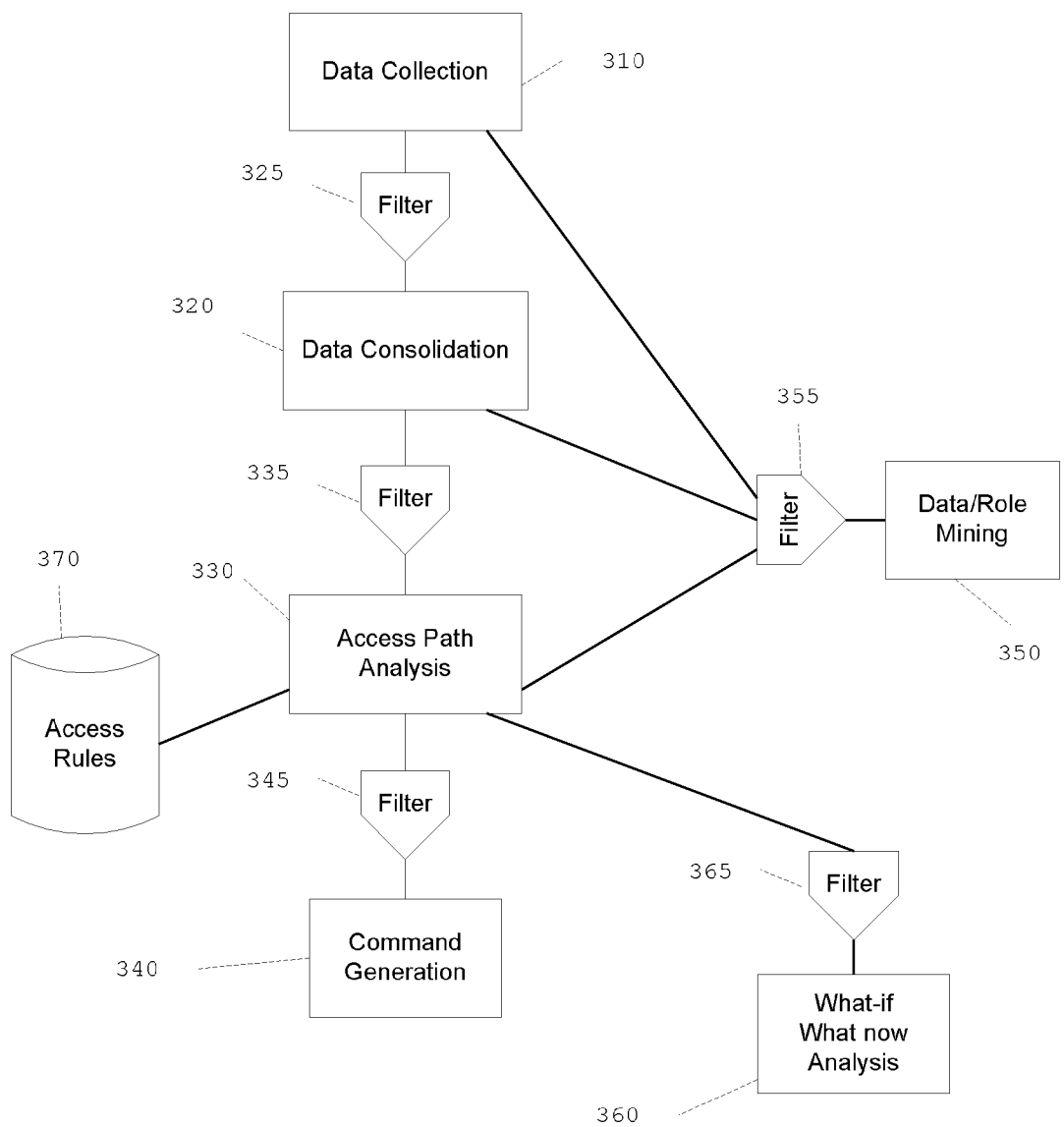
FIG. 3 is a flowchart of an example of an implementation of a process for managing security objects according to an embodiment of the present subject matter.

FIG. 3 is a flowchart of an example of an implementation of a process for managing security objects, including: a data collection phase (310); a data consolidation phase (320); a filter (325) between these two phases; an access path analysis phase (330); a filter (335) between the data consolidation phase (320) and the access path analysis phase (330) relying on a database of access rules, or access control descriptors (370); a command generation phase (340); a filter (345) between the access path analysis phase (330) and command generation phase (340); a data/role mining phase (350); a filter (355) between each of the data collection phase (310), the data consolidation phase (320), and the access path analysis phase (330) and the data/role mining phase (350); a what-if what-now analysis phase (360); and a filter (365) between the access path analysis phase (330) and the what-if what-now analysis phase (360).

For the data collection phase (310), information is gathered about the following aspects: who; what (type/name of the resource); when (date/time of the event); where (system name); access level; some attributes of the user, environment settings; and security product specific information, like the resource profile used.

During the data consolidation (data reduction) phase (320), filtering of the raw data may be done. The resulting data is combined. Multiple identical records are combined into a single record, and a count value is added to record how many duplicate records were present. For the determination of whether records are duplicates, one or more of the collected aspects may be considered as discarded. In the consolidated output file, the discarded aspect may be replaced by a single representative value for that aspect. The proposed aspect to be discarded in the current implementation is the date and time of the event.

The consolidation process allows retaining data from an extended time period with minimal resources usage. The time period from which data is consolidated may be chosen to be as appropriate for the desired type of analysis. This consolidation process is typically used for several representative time periods (e.g., 30 minutes, 1 day, 1 month, or one year).

The access path analysis phase (330) includes a static access path analysis phase, which has been described in detail with respect to FIG. 2, and a dynamic access path analysis phase.

During the dynamic access path analysis portion of the access path analysis phase (330), the internal representation of the result of the static access path analysis may be combined with the actual usage information from the (consolidated) access data. This combination yields a dynamic access path analysis. All equivalent access paths are marked as used via either a flag or a counter. All access paths that do not contribute to the actual access decision by the security product (be it granting or denying access) remain non-marked.

The result of this dynamic aspect of the analysis is that all paths that could have participated in the access decision are marked as used, independent of the actual process used by the security product. For instance, the security product may use a first hit algorithm and stop the access verification process immediately. In contrast, the dynamic access path analysis will perform an exhaustive search and marking of all possible contributors. All the intermediate steps are marked. In the example above of FIG. 2, the following are marked: the user (200), the ResGrp3 (253), and the second access control descriptor (resdesc2) (246). If a user-group would have been involved, it would also be marked as used.

The result of the dynamic analysis may be used for three different applications. The first of these applications is the command generation phase (340) to remove selected definitions. The second of these applications is the dynamic role/mining phase (350), which is based on the actual usage of the intermediate definitions that lead to access. Using the example introduced above within FIG. 2, the ACL entry for the user (200) in the ResGrp3 (253) is marked as used, the role of which this ACL entry is a representation is active. The third of these applications is the what-if what-now analysis phase (360), which involves comparison of the access granted using the current or proposed security definitions against the historically obtained access information.

After optional filtering using the filter (335) of the (consolidated) access data or/and optional filtering using the filter (345) of the security definitions, commands may be generated at the command generation phase (340) for those security definitions that are unused, hardly used, or used only during a specified time interval. A typical time interval is the one side unbounded interval "more than 6 months ago." The commands generated may be for userids (200), user-groups (230, 240, 250, 260), userid_to_group connections, ACL-entries, resource-groups (233, 243, 253), resource-descriptors (236, 246, 256, 266), and resource-group_to_resource descriptor connections. The system as proposed does not require immediate execution of the generated commands, but allows inspection and modification of the generated commands by a security administrator.

The output of the data collection phase (310), the output of the data consolidation phase (320), and the output of the dynamic access path analysis portion of the access path analysis phase (330) may be used for direct reporting, or may be used for data mining purposes in the data/role mining phase (350). One particular type of data mining for which this data may be used is "role-mining." Role mining within the data/role mining phase (350) is the process of determining access roles (job roles) in order to optimize the resource access authorizations granted to users, with respect to, for example authorization level, number of roles defined or assigned, or a minimum required administrative effort.

The what-if what-now analysis phase (360) may be used to verify that previous events are still handled as desired using proposed or current definitions. By using a selected security definitions database, it is possible to compare the actual events that occurred in the past and that were captured against the proposed or current security definitions. This may be done efficiently due to the data reduction step of the data consolidation phase (320) and the complete access path analysis phase (330).

Figure 4:
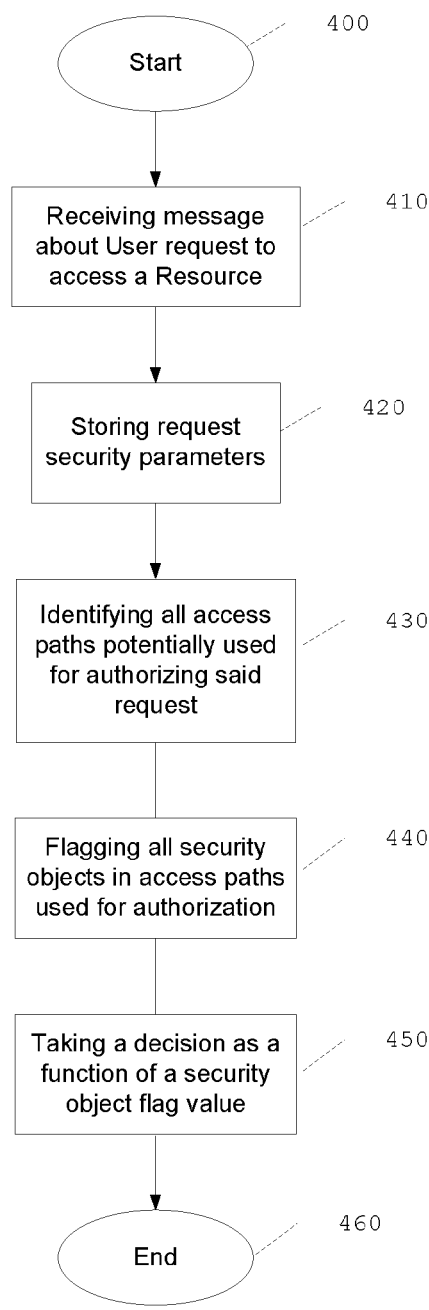
FIG. 4 is a flowchart of an example of an implementation of an activity diagram according to an embodiment of the present subject matter.

FIG. 4 is a flow chart of an example of an implementation of an activity diagram comprising the following steps with a start at (400). The process continues by receiving a message about a user request to access a resource at (410). The process continues by storing the request security parameters at (420), including the userid, the resource identifier, the requested access level, a counter incremented each time access by the user for the resource is detected, and storing the following optional security parameters: an identifier of the access control descriptor, the timestamp of the request to represent the date at which access was last requested, three additional counters, the first one being incremented each time the access is granted, the second being incremented each time the access is denied, and a third to count that the system does not know what happened. The process continues by identifying all access paths potentially used for authorizing the request at (430). The process continues by flagging all the security objects at (440), including the identity annunciators such as the user groups, the resource groups and the access control descriptors, which may be used for the authorization (this step may flag security objects which were actually never used by the system, because the system may stop immediately after an access path has been found, and does not try to find exhaustively all the access paths in the live environment). The process continues by taking (making/determining) a decision about a security object as a function of the flag value of this security object at (450), by default, the flag value is that the security object is not used, the dynamic access path analysis portion of the access path analysis phase (330) changing that value to match the one determined during the data consolidation phase (320) if the security object was used within an access path. The process ends at (460).

Another embodiment includes a method for monitoring access control decisions, even if they are not all logged in an audit trail. Instead, a count is maintained, summarized by all parameters that are of interest in deciding which authorizations may have granted or denied the access, including but not limited to subject, object, access level, and decision. After an (arbitrary, usually configurable) time interval, it is written out as what is called herein an Access Summary record. This helps in assuring data loss is limited to a maximum of one time interval. Information of these time intervals may be consolidated to create Access Summary records covering a longer time interval. The access summary records are compared with the current security rules (access control database) to mark whether (or alternatively, count how often) a security rule, security attribute, or specific authorization may have been used (for authorization or denial) in the period covered by the access summary. An optional filter step may be performed, where for example subsets of the security rules may be selected for autonomic processing, human approval, or no processing at all. An optional human approval step may be performed, where authorizations not marked as used may be approved for removal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment containing both hardware and software aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing, in a computer system network, access by a user to a resource, comprising:
   performing access path analysis within the computer system network in response to receipt of a message indicating that the user is requesting an access, with a requested access level, to the resource, where the access path analysis identifies all different sequences of different types of security objects usable by the user to access the resource, and where each different sequence of security objects:
      begins with a user identity annunciator security object of the user that is followed in the respective sequence by at least one of a different user group security object and a different resource group security object that identifies groupings of resources; and
      converges with each other different sequence of security objects at a single resource descriptor security object that defines access controls for the resource;
   identifying, during the access path analysis, a plurality of different concurrent access paths within the computer system network, the plurality of different concurrent access paths comprising all different concurrent access path security object sequences usable to authorize the user to access the resource with the requested access level;
   setting a flag of each security object of each identified different concurrent access path of the identified plurality of different concurrent access paths to a first value, where a change from the first value represents a use of the security object in authorizing access to the resource;
   receiving another security object comprising the flag, where the other security object comprises one of a user group security object and a resource group security object;
   making a decision with respect to whether the received other security object was used within one of the identified plurality of different concurrent access paths as a function of its flag value; and
   making a decision to delete the received other security object if a timestamp set in its flag is older than a predefined date.

2. The method of claim 1, further comprising:
   storing in a record, in response to receipt of the message, a first identifier of the user, a second identifier of the resource, the requested access level, and a resource request value that represents that the access to the resource was requested;
   where storing in the record the resource request value that represents that the access to the resource was requested comprises incrementing a counter each time the access is requested.

3. The method of claim 2, further comprising making a decision to delete the received other security object if a value of the counter is below a predefined threshold.

4. The method of claim 2, further comprising storing in the record a timestamp at which the access is requested and where setting the flag of each security object of each identified different concurrent access path of the identified plurality of different concurrent access paths to the first value comprises setting the timestamp in the flag.

5. The method of claim 1, where:
   identifying, during the access path analysis, the plurality of different concurrent access paths within the computer system network comprises identifying a first access path comprising a first access level and a first concurrent access path security object sequence, and identifying a second access path comprising a second access level and a second concurrent access path security object sequence, where the first and second access levels are in conflict, and where the first access path is overruled by the second access path; and
   setting the flag of each security object of each identified different concurrent access path of the identified plurality of different concurrent access paths to the first value comprises setting the flag of the security objects of the first access path to a second value, so as to represent that the security objects of the first access path are not used because the first access path is overruled.

6. The method of claim 5, further comprising making a decision to delete the received other security object if its flag is set to the second value.

7. The method of claim 1, where the user identity annunciator security object represents a user role of the user.

8. An apparatus for managing, in a computer system network, access by a user to a resource, comprising:
   a memory; and
   a processor programmed to:
      perform access path analysis within the computer system network in response to receipt of a message indicating that the user is requesting an access, with a requested access level, to the resource, where the access path analysis identifies all different sequences of different types of security objects usable by the user to access the resource, and where each different sequence of security objects:
         begins with a user identity annunciator security object of the user that is followed in the respective sequence by at least one of a different user group security object and a different resource group security object that identifies groupings of resources; and
         converges with each other different sequence of security objects at a single resource descriptor security object that defines access controls for the resource;

identify, during the access path analysis, a plurality of different concurrent access paths within the computer system network, the plurality of different concurrent access paths comprising all different concurrent access path security object sequences usable to authorize the user to access the resource with the requested access level;

set a flag of each security object of each identified different concurrent access path of the identified plurality of different concurrent access paths to a first value, where a change from the first value represents a use of the security object in authorizing access to the resource;

receive another security object comprising the flag, where the other security object comprises one of a user group security object and a resource group security object;

make a decision with respect to whether the received other security object was used within one of the identified plurality of different concurrent access paths as a function of its flag value; and make a decision to delete the received other security object if a timestamp set in its flag is older than a predefined date.

9. The apparatus of claim 8, where the processor is further programmed to:

store in a record in the memory, in response to receipt of the message, a first identifier of the user, a second identifier of the resource, the requested access level, and a resource request value that represents that the access to the resource was requested;

where in being programmed to store in the record in the memory the resource request value that represents that the access to the resource was requested, the processor is programmed to increment a counter each time the access is requested.

10. The apparatus of claim 9 where the processor is further programmed to make a decision to delete the received other security object if a value of the counter is below a predefined threshold.

11. The apparatus of claim 9, where the processor is further programmed to store in the record in the memory a timestamp at which the access is requested and where, in being programmed to set the flag of each security object of each identified different concurrent access path of the identified plurality of different concurrent access paths to the first value, the processor is programmed to set the timestamp in the flag.

12. The apparatus of 8, where:

in being programmed to identify, during the access path analysis, the plurality of different concurrent access paths within the computer system network, the processor is programmed to identify a first access path comprising a first access level and a first concurrent access path security object sequence, and identify a second access path comprising a second access level and a second concurrent access path security object sequence, where the first and second access levels are in conflict, and where the first access path is overruled by the second access path; and in being programmed to set the flag of each security object of each identified different concurrent access path of the identified plurality of different concurrent access paths to the first value, the processor is programmed to set the flag of the security objects of the first access path to a second value, so as to represent that the security objects of the first access path are not used because the first access path is overruled.

13. The apparatus of claim 12, where the processor is further programmed to make a decision to delete the received other security object if its flag is set to the second value.

14. The apparatus of claim 8, where the user identity annunciator security object represents a user role of the user.

15. A computer program product for managing, in a computer system network, access by a user to a resource comprising a computer readable storage medium including computer readable program code, where the computer readable program code when executed on a computer causes the computer to:

perform access path analysis within the computer system network in response to receipt of a message indicating that the user is requesting an access, with a requested access level, to the resource, where the access path analysis identifies all different sequences of different types of security objects usable by the user to access the resource, and where each different sequence of security objects:

begins with a user identity annunciator security object of the user that is followed in the respective sequence by at least one of a different user group security object and a different resource group security object that identifies groupings of resources; and converges with each other different sequence of security objects at a single resource descriptor security object that defines access controls for the resource;

identify, during the access path analysis, a plurality of different concurrent access paths within the computer system network, the plurality of different concurrent access paths comprising all different concurrent access path security object sequences usable to authorize the user to access the resource with the requested access level;

set a flag of each security object of each identified different concurrent access path of the identified plurality of different concurrent access paths to a first value, where a change from the first value represents a use of the security object in authorizing access to the resource;

receive another security object comprising the flag, where the other security object comprises one of a user group security object and a resource group security object;

make a decision with respect to whether the received other security object was used within one of the identified plurality of different concurrent access paths as a function of its flag value; and make a decision to delete the received other security object if a timestamp set in its flag is older than a predefined date.

16. The computer program product of claim 15, where the computer readable program code when executed on the computer further causes the computer to:

store in a record, in response to receipt of the message, a first identifier of the user, a second identifier of the resource, the requested access level, and a resource request value that represents that the access to the resource was requested;

where in causing the computer to store in the record the resource request value that represents that the access to the resource was requested, the computer readable program code when executed on the computer causes the computer to increment a counter each time the access is requested.

17. The computer program product of claim 16, where the computer readable program code when executed on the computer further causes the computer to make a decision to delete the received other security object if a value of the counter is below a predefined threshold.

18. The computer program product of claim 16, where the computer readable program code when executed on the computer further causes the computer to store in the record a timestamp at which the access is requested and where, in causing the computer to set the flag of each security object of each identified different concurrent access path of the identified plurality of different concurrent access paths to the first value, the computer readable program code when executed on the computer causes the computer to set the timestamp in the flag.

19. The computer program product of 15, where:
in causing the computer to identify, during the access path analysis, the plurality of different concurrent access paths within the computer system network, the computer readable program code when executed on the computer causes the computer to identify a first access path comprising a first access level and a first concurrent access path security object sequence, and identify a second access path comprising a second access level and a second concurrent access path security object sequence, where the first and second access levels are in conflict, and where the first access path is overruled by the second access path; and
in causing the computer to set the flag of each security object of each identified different concurrent access path of the identified plurality of different concurrent access paths to the first value, the computer readable program code when executed on the computer causes the computer to set the flag of the security objects of the first access path to a second value, so as to represent that the security objects of the first access path are not used because the first access path is overruled.

20. The computer program product of claim 19, where the computer readable program code when executed on the computer further causes the computer to make a decision to delete the received other security object if its flag is set to the second value.

21. The computer program product of claim 15, where the user identity annunciator security object represents a user role of the user.

* * * * *